US009283525B2

(12) United States Patent
Shiotani et al.

(10) Patent No.: US 9,283,525 B2
(45) Date of Patent: Mar. 15, 2016

(54) POROUS POLYMER FILM AND PRODUCTION METHOD FOR POROUS POLYMER FILM

(75) Inventors: Yuko Shiotani, Settsu (JP); Yoshito Tanaka, Settsu (JP); Jun Miki, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 148 days.

(21) Appl. No.: 14/127,674

(22) PCT Filed: Jun. 20, 2012

(86) PCT No.: PCT/JP2012/065761
§ 371 (c)(1),
(2), (4) Date: Dec. 19, 2013

(87) PCT Pub. No.: WO2012/176810
PCT Pub. Date: Dec. 27, 2012

(65) Prior Publication Data
US 2014/0138304 A1 May 22, 2014

(30) Foreign Application Priority Data

Jun. 22, 2011 (JP) ................................. 2011-138571
Jan. 13, 2012 (JP) ................................. 2012-005120
Jan. 13, 2012 (JP) ................................. 2012-005121

(51) Int. Cl.
*B01D 69/08* (2006.01)
*B01D 71/36* (2006.01)
*B01D 71/34* (2006.01)
*C08J 9/28* (2006.01)
*C08F 214/22* (2006.01)
*C08F 14/26* (2006.01)
*B01D 71/32* (2006.01)
*C08G 61/12* (2006.01)
*C08F 8/26* (2006.01)
*C08F 214/26* (2006.01)

(52) U.S. Cl.
CPC ............... *B01D 71/36* (2013.01); *B01D 69/08* (2013.01); *B01D 71/32* (2013.01); *B01D 71/34* (2013.01); *C08F 8/26* (2013.01); *C08F 214/22* (2013.01); *C08G 61/121* (2013.01); *C08J 9/28* (2013.01); *B01D 2325/36* (2013.01); *C08F 214/26* (2013.01); *C08J 2201/0544* (2013.01); *C08J 2327/14* (2013.01); *C08J 2327/18* (2013.01)

(58) Field of Classification Search
None
See application file for complete search history.

(56) References Cited

U.S. PATENT DOCUMENTS

| | | | |
|---|---|---|---|
| 4,384,047 A | 5/1983 | Benzinger et al. | |
| 4,623,670 A | 11/1986 | Mutoh et al. | |
| 4,919,810 A | 4/1990 | Itoh et al. | |
| 5,070,162 A | 12/1991 | Oxenrider et al. | |
| 5,282,965 A | 2/1994 | Urairi et al. | |
| 5,988,400 A | 11/1999 | Karachevteev et al. | |
| 6,051,682 A * | 4/2000 | Debrabander et al. | 528/501 |
| 6,329,471 B1 | 12/2001 | Mizuide et al. | |
| 7,182,870 B2 | 2/2007 | Minegishi et al. | |
| 2003/0094409 A1 | 5/2003 | Minegishi et al. | |
| 2003/0232184 A1 | 12/2003 | Morikawa et al. | |
| 2005/0258101 A1 | 11/2005 | Minegishi et al. | |
| 2008/0078718 A1 | 4/2008 | Tada et al. | |
| 2008/0156722 A1 | 7/2008 | Suzuki et al. | |
| 2009/0039014 A1 | 2/2009 | Katsurao et al. | |
| 2009/0061280 A1* | 3/2009 | Ino et al. | 429/33 |
| 2009/0297822 A1* | 12/2009 | Fujimura et al. | 428/314.2 |
| 2011/0020728 A1* | 1/2011 | Kita et al. | 429/483 |
| 2014/0142209 A1 | 5/2014 | Shiotani et al. | |

FOREIGN PATENT DOCUMENTS

| | | |
|---|---|---|
| CN | 1972737 A | 5/2007 |
| CN | 1980729 A | 6/2007 |
| CN | 101227967 A | 7/2008 |
| JP | 56-152851 A | 11/1981 |
| JP | 58-93734 A | 6/1983 |
| JP | 58-98105 A | 6/1983 |
| JP | 58-142905 A | 8/1983 |
| JP | 60-209205 A | 10/1985 |
| JP | 61-4504 A | 1/1986 |
| JP | 63-11370 B2 | 3/1988 |
| JP | 63-248405 A | 10/1988 |
| JP | 63-248406 A | 10/1988 |
| JP | 1-247448 A | 10/1989 |
| JP | 2-502832 A | 9/1990 |
| JP | 3-38227 A | 2/1991 |
| JP | 3-38228 A | 2/1991 |
| JP | 3-66714 A | 3/1991 |
| JP | 4-94724 A | 3/1992 |
| JP | 10-512194 A | 11/1998 |
| JP | 11-269225 A | 10/1999 |
| JP | 2003-138422 A | 5/2003 |

(Continued)

OTHER PUBLICATIONS

International Search Report mailed Aug. 28, 2012 for PCT/JP2012/065773.
International Preliminary Report on Patentability and Written Opinion of the International Searching Authority issued Dec. 23, 2013 for PCT/JP2012/065761.
International Preliminary Report on Patentability and Written Opinion of the International Searching Authority issued Dec. 23, 2013 for PCT/JP2012/065773.

(Continued)

*Primary Examiner* — Kara Boyle
(74) *Attorney, Agent, or Firm* — Sughrue Mion, PLLC

(57) ABSTRACT

The present invention aims to provide a porous polymer membrane that is excellent not only in water permeability and alkali resistance but also in mechanical strength. The porous polymer membrane of the present invention includes a fluoropolymer (A) that includes a vinylidene fluoride unit and a tetrafluoroethylene unit.

10 Claims, No Drawings

(56) References Cited

FOREIGN PATENT DOCUMENTS

| JP | 2003-236351 A | | 8/2003 |
|---|---|---|---|
| JP | 2005-522316 A | | 7/2005 |
| JP | 2007-167839 A | | 7/2007 |
| JP | 2007167839 A | * | 7/2007 |
| JP | 2009-203584 A | | 9/2009 |
| WO | 92/09357 A1 | | 6/1992 |
| WO | 03/031038 A1 | | 4/2003 |
| WO | 03/086595 A1 | | 10/2003 |
| WO | 03/106545 A1 | | 12/2003 |

OTHER PUBLICATIONS

Extended European Search Report dated Nov. 24, 2014, issued by the European Patent Office in counterpart European Application No. 12802577.2.

International Search Report for PCT/JP2012/065761 dated Aug. 21, 2012.

* cited by examiner

POROUS POLYMER FILM AND PRODUCTION METHOD FOR POROUS POLYMER FILM

CROSS REFERENCE TO RELATED APPLICATIONS

This application is a National Stage of International Application No. PCT/JP2012/065761 filed Jun. 20, 2012, claiming priority based on Japanese Patent Application Nos. 2011-138571 filed Jun. 22, 2011, 2012-005120 filed Jan. 13, 2012 and 2012-005121 filed Jan. 13, 2012, the contents of all of which are incorporated herein by reference in their entirety.

TECHNICAL FIELD

The present invention relates to a porous polymer membrane and a method of producing the porous polymer membrane. Specifically, the present invention relates to a porous polymer membrane suitably used as a microfiltration membrane or ultrafiltration membrane for treating water, and a method of producing the membrane.

BACKGROUND ART

Porous membranes have recently been utilized in various fields, including not only for treatment of water (e.g. water purification, waste water treatment), medical usage (e.g. blood purification), and the food industry, but also for use as charged membranes, battery separators, and fuel cells.

For example, porous membranes are used in the field of water treatment such as water purification and waste water treatment for substitution for conventional purposes, including sand filtration and coagulative precipitation, and improvement in the quality of treated water. Since a large quantity of water is treated in the field of water treatment, porous membranes are required to have excellent water permeability. Porous membranes with excellent water permeability enable to reduce the area of the membranes, which in turn reduces the size of water purification apparatuses. Accordingly, facility costs can be reduced.

Moreover, porous membranes are required to have chemical resistance because the membranes may be washed with an alkaline solution in chemical cleaning. Studies have been made on porous membranes that contain a fluoropolymer (e.g. polyvinylidene fluoride resin) as a material with high chemical resistance (see, for example, Patent Literatures 1 to 14). However, conventional porous membranes have insufficient water permeability, and thus need improvement.

CITATION LIST

Patent Literature

Patent Literature 1 JP-A 2009-203584
Patent Literature 2 JP-T 10-512194
Patent Literature 3 JP-A 63-248405
Patent Literature 4 JP-A 63-248406
Patent Literature 5 JP-A 58-98105
Patent Literature 6 WO 2003/106545
Patent Literature 7 JP-A 2003-138422
Patent Literature 8 JP-A 2003-236351
Patent Literature 9 JP-A 3-38228
Patent Literature 10 JP-A 3-38227
Patent Literature 11 JP-T 2005-522316
Patent Literature 12 JP-A 61-4504
Patent Literature 13 JP-B 63-11370
Patent Literature 14 JP-A 2007-167839

SUMMARY OF INVENTION

Technical Problem

The present invention provides a porous polymer membrane that is excellent not only in water permeability and alkali resistance but also in mechanical strength.

Solution to Problem

The porous polymer membrane of the present invention includes a fluoropolymer (A) that includes a vinylidene fluoride unit and a tetrafluoroethylene unit.

The porous polymer membrane of the present invention preferably comprises the fluoropolymer (A) that includes the vinylidene fluoride unit and the tetrafluoroethylene unit in a molar ratio of the vinylidene fluoride unit/tetrafluoroethylene unit of 50 to 90/50 to 10.

Preferably, the porous polymer membrane of the present invention has a surface that has a ratio of oxygen/fluorine content (O/F) on the surface of not less than 0.050 but less than 0.150 when measured by X-ray photoelectron spectroscopy (XPS). Preferably, the porous polymer membrane has a surface that has a (C—F/C—H) ratio representing a ratio of C—F bonds to C—H bonds on the surface of larger than 0.50 when measured by X-ray photoelectron spectroscopy (XPS).

Preferably, the fluoropolymer (A) further has a unit represented by the following formula (1) (hereinafter, also referred to as a Formula (1) unit):

$$—CHX^1—CX^2(OR)— \qquad (1)$$

wherein one of $X^1$ and $X^2$ is a hydrogen atom, and the other is a fluorine atom; and R is a hydrogen atom or a $C_1$-$C_8$ alkyl group.

The R in the formula (1) is preferably a hydrogen atom, a methyl group, or an ethyl group.

A method of producing the porous polymer membrane according to the present invention comprises at least a step of forming a porous membrane from a fluoropolymer (A') that includes a vinylidene fluoride unit and a tetrafluoroethylene unit.

In the method of producing the porous polymer membrane according to the present invention, the step of forming a porous membrane produces a porous membrane-shaped product preferably through a non-solvent induced phase separation method and/or a thermally induced phase separation method.

The method of producing the porous polymer membrane according to the present invention preferably further comprises a step of performing an alkali treatment in the presence of water and/or a $C_1$-$C_8$ alcohol.

The alcohol is preferably ethanol or methanol.

In the method of producing the porous polymer membrane according to the present invention, the fluoropolymer (A') includes the vinylidene fluoride unit and the tetrafluoroethylene unit in a molar ratio of the vinylidene fluoride unit/tetrafluoroethylene unit of 50 to 90/50 to 10.

The porous polymer membrane is preferably a hollow fiber membrane. Moreover, the porous polymer membrane is preferably used for treating water.

Advantageous Effects of Invention

The porous polymer membrane of the present invention has the aforementioned structure, and thus it is excellent not only in water permeability and alkali resistance but also in mechanical strength.

The method of producing a porous polymer membrane according to the present invention enables to favorably produce the porous polymer membrane.

DESCRIPTION OF EMBODIMENTS

The following describes the present invention in detail.

The porous polymer membrane of the present invention includes a fluoropolymer (A) that includes a vinylidene fluoride (VdF) unit and a tetrafluoroethylene (TFE) unit.

The fluoropolymer (A) includes a VdF unit and a TFE unit. The fluoropolymer (A) including a VdF unit and a TFE unit enables the porous polymer membrane of the present invention to have excellent alkali resistance and prevents reduction in the mechanical strength of the membrane caused by an alkali treatment.

For example, in the case of a porous membrane made of polyvinylidene fluoride, an alkali treatment may reduce the elongation retention rate or breaking stress of the porous polymer membrane in a tensile test. This is considered because the polyvinylidene fluoride is defluorinated to produce double bonds, which results in a fragile membrane. Moreover, the generated double bonds cause brownish coloration of the membrane. The TFE incorporated in the fluoropolymer (A) suppresses defluorination caused by an alkali treatment, and thus coloration of the porous membrane due to the double bonds is suppressed. As a result, the membrane can be used for a long time.

The porous polymer membrane of the present invention includes the fluoropolymer (A) having excellent water permeability and alkali resistance. Thus, the membrane is excellent not only in the permeability to treatment liquids, such as water, but also in the mechanical strength, such as tensile strength, elongation property, and bending strength. For example, the membrane has a significantly higher elongation property than a porous polymer membrane made of polyvinylidene fluoride. Moreover, the porous polymer membrane of the present invention can excellently filter particles. Controlling the membrane-forming conditions enables to produce a membrane that can separate particles having a size as small as approximately 50 nm.

The fluoropolymer (A) includes the VdF unit and the TFE unit in a molar ratio of the VdF unit/TFE unit of preferably 50 to 90/50 to 10, and more preferably 50 to 85/50 to 15.

The reason is as follows: not less than 10 mol % of the TFE unit tends to suppress defluorination caused by an alkali treatment; not less than 15 mol % of the TFE unit remarkably enhances alkali resistance; but not less than 50 mol % of the TFE unit reduces the solubility in a solvent, resulting in difficulty in membrane formation.

Preferably, the porous polymer membrane has a surface that has a ratio of oxygen/fluorine content (O/F) on the surface of not less than 0.050 but less than 0.150 when measured by X-ray photoelectron spectroscopy (XPS).

A (O/F) ratio of 0.150 or higher reduces the strength of the porous polymer membrane, whereas a (O/F) ratio of lower than 0.150 can achieve excellent strength.

The lower limit of the (O/F) ratio is preferably 0.050. If the (O/F) ratio is lower than 0.050, the amount of the unit represented by the formula (1) is small, and the water permeability of the porous polymer membrane may be low.

The (O/F) ratio can be calculated from values obtained by X-ray photoelectron spectroscopy (XPS).

(O/F)ratio=$A/B$

A: Value of the peak area of oxygen atom
B: Value of the peak area of fluorine atom The porous polymer membrane has a surface that has a (C—F/C—H) ratio representing a ratio of C—F bonds to C—H bonds on the surface of preferably larger than 0.50 and more preferably larger than 0.65 when measured by X-ray photoelectron spectroscopy (XPS).

If the (C—F/C—H) ratio is 0.50 or lower, the porous polymer membrane has insufficient mechanical strength, and may be colored dark brown.

The upper limit of the (C—F/C—H) ratio is preferably 2.0, and more preferably 1.4. A larger (C—F/C—H) ratio leads to a higher hydrophobicity on the surface of the porous polymer membrane. If the (C—F/C—H) ratio is larger than 2.0, the membrane may have a low water permeability due to the hydrophobicity on the surface.

The (C—F/C—H) ratio can be calculated from values obtained by X-ray photoelectron spectroscopy (XPS) based on the following expression.

(C—F/C—H)ratio=$a/b$ a: Value of the peak area of the interatomic bonding energy (292.4 eV) derived from C—F bonds
b: Value of the peak area of the interatomic bonding energy (286.0 eV and 287.8 eV) derived from C—H bonds Preferably, the fluoropolymer (A) further has a unit represented by the following formula (1) (hereinafter, also referred to as a formula (1) unit):

$$-CHX^1-CX^2(OR)- \quad (1)$$

wherein one of $X^1$ and $X^2$ is a hydrogen atom, and the other is a fluorine atom; and R is a hydrogen atom or a $C_1$-$C_8$ alkyl group.

If the fluoropolymer (A) has the formula (1) unit, the porous polymer membrane of the present invention has excellent water permeability.

The R in the formula (1) may be any of a hydrogen atom and a $C_1$-$C_8$ alkyl group, but is preferably a hydrogen atom, a methyl group, or an ethyl group. This arrangement greatly improves the water permeability of the porous polymer membrane.

If the fluoropolymer (A) has a plurality of the formula (1) units, Rs in the units may be the same as or different from one another.

Hereinafter, the fluoropolymer (A) having the formula (1) unit is also referred to as a fluoropolymer (A1).

In the fluoropolymer (A1), the molar ratio of the VdF unit, TFE unit, and formula (1) unit (VdF unit/TFE unit/formula (1) unit) is preferably 30 to 84.9/10 to 50/0.1 to 20.

In this case, the fluoropolymer (A1) achieves excellent hydrophilicity and excellent mechanical strength at high levels.

The fluoropolymer (A1) may have different structural unit(s), such as a hexafluoropropylene unit, a chlorotrifluoroethylene unit, or a perfluorovinyl ether unit, other than the formula (1) unit, as long as the properties are maintained.

In a surface of the porous polymer membrane, the C—O bond content in a total of C—C bonds and bonds between C and an atom other than C is preferably not less than 0.80 mol %, and more preferably not less than 1.50 mol % when measured by X-ray photoelectron spectroscopy (XPS).

A larger C—O bond content in a total of C—C bonds and bonds between C and an atom other than C enables to produce a porous polymer membrane having greater hydrophilicity.

In the case of a larger C—O bond content in a total of C—C bonds and bonds between C and an atom other than C, the proportion of the formula (1) unit in the fluoropolymer (A) is supposed to be larger. For example, if the C—O bond content is not less than 0.80 mol %, the fluoropolymer (A) is considered to have the formula (1) unit.

The C—O bond content in a total of C—C bonds and bonds between C and an atom other than C is preferably not more than 10.0 mol % as this enables the porous polymer membrane to have excellent mechanical strength.

The C—O bond content in a total of C—C bonds and bonds between C and an atom other than C can be calculated from values obtained by X-ray photoelectron spectroscopy (XPS) based on the following expression.

C—O bond content in a total of C—C bonds and bonds between C and an atom other than C=α/β

α: Value of the peak area of the interatomic bonding energy (290.1 eV) derived from C—O bonds β: Value of the peak area of a total of the interatomic bonding energy (280.0 to 300.0 eV) derived from C—C bonds and bonds between C and an atom other than C The porous polymer membrane of the present invention may contain the fluoropolymer (A) in a part thereof, or may consist of the fluoropolymer (A).

Preferably, the porous polymer membrane has a surface including the fluoropolymer (A1).

This arrangement allows the porous polymer membrane to have excellent water permeability.

As described later, the porous polymer membrane of the present invention can also be produced through a specific alkali treatment on a fluoropolymer (A') having a VdF unit and a TFE unit.

Thus, the porous polymer membrane may include the fluoropolymer (A') that includes a VdF unit and a TFE unit, and the fluoropolymer (A1).

In the porous polymer membrane partially including the fluoropolymer (A1), the whole porous polymer membrane preferably includes 0.01 to 99% by weight of the fluoropolymer (A1).

The weight average molecular weight of the fluoropolymer (A) depends on the application of the porous polymer membrane of the present invention, but is preferably not less than 10000 in terms of the mechanical strength and membrane forming property. It is more preferably 50000 to 1000000, and still more preferably 100000 to 800000. The weight average molecular weight can be determined by gel permeation chromatography (GPC).

The porous polymer membrane of the present invention may substantially consist of the fluoropolymer (A), or may contain other resins in addition to the fluoropolymer (A).

In terms of the mechanical strength and alkali resistance, in the porous polymer membrane of the present invention containing other resins, the fluoropolymer (A1) content in the whole porous polymer membrane is preferably not less than 40% by weight, more preferably not less than 60% by weight, and still more preferably not less than 80% by weight.

Examples of other resins include thermoplastic resins. Thermoplastic resins deform or flow when heated or compressed.

Examples of the thermoplastic resins include polyethylene-based resin, polypropylene-based resin, polyvinylidene fluoride resin, acrylic resin, polyacrylonitrile, acrylonitrile-butadiene-styrene (ABS) resin, polystyrene resin, acrylonitrile-styrene (AS) resin, vinyl chloride resin, polyethylene terephthalate, polyamide resin, polyacetal resin, polycarbonate resin, modified polyphenylene ether resin, polyphenylene sulfide resin, polyamideimide resin, polyetherimide resin, polysulfone resin, polyethersulfone resin, and mixtures and copolymers thereof. Any resin miscible with those may be added.

The thermoplastic resin is preferably at least one selected from the group consisting of polyethylene-based resin, polypropylene-based resin, polyvinylidene fluoride resin, and acrylic resin as these resins have high chemical resistance.

The polyethylene-based resin includes a polyethylene homopolymer or a polyethylene copolymer. The polyethylene-based resin may contain plural kinds of polyethylene copolymers. Examples of the polyethylene copolymer include copolymers of ethylene and at least one selected from linear unsaturated hydrocarbons, such as propylene, butene, and pentene.

The polypropylene-based resin contains a polypropylene homopolymer or a polypropylene copolymer. The polypropylene-based resin may contain plural kinds of polypropylene copolymers. Examples of the polypropylene copolymer include copolymers of propylene and at least one selected from linear unsaturated hydrocarbons, such as ethylene, butene, and pentene.

The acrylic resin is a polymer compound mainly containing a polymer such as acrylic acid, methacrylic acid, and derivatives thereof (e.g. acrylamide, acrylonitrile). Acrylic acid ester resin and methacrylic acid ester resin are particularly preferred.

Concomitant use of aforementioned other resins enables to control the membrane strength, water permeability, and filtering performance.

From the viewpoints of hydrophilization and control of the phase separation, the porous polymer membrane of the present invention may further contain an additive, such as polyvinyl pyrrolidone, polymethyl methacrylate resin, montmorillonite, $SiO_2$, $CaCO_3$, or polytetrafluoroethylene.

The porous polymer membrane of the present invention has a pore size of preferably 2 nm to 1.0 µm, and more preferably 5 nm to 0.5 µm. Too small a pore size may lead to insufficient gas or liquid permeability. Too large a pore size reduces the filtering performance and mechanical strength, which may lead to easy breaking of the membrane.

The pore size is determined by taking a photograph of a surface of the porous polymer membrane with SEM or other devices at a magnification allowing clear observation of fine pores and measuring the size of the fine pores. The size of an elliptical pore is $(a \times b)^{0.5}$, where a and b are length of the minor and major axes. An approximate pore size can be determined from the particle filtering rate. For example, a porous membrane which filters not less than 95% of 50-nm polystyrene particles is considered to have a pore size of 50 nm or smaller.

The porous polymer membrane of the present invention has a pure water permeability coefficient of preferably $1.0 \times 10^{-10}$ $m^3/m^2/s/Pa$ or higher, and more preferably $2.0 \times 10^{-10}$ $m^3/m^2/s/Pa$ or higher. There is no limitation on the maximum pure water permeability coefficient. The higher the value, the better, as long as the desired permeability and strength are maintained.

For determination of the pure water permeability coefficient, deionized water is pressurized at not lower than 0.01 MPa with a pump or nitrogen at a temperature of 25° C. to allow the water to be permeated through a produced porous polymer membrane. Concretely, the pure water permeability coefficient is determined based on the following expression.

Pure water permeability coefficient=(Amount of permeated water)/(Membrane area)/(Permeation time)/(Evaluation pressure)

The porous polymer membrane of the present invention has a 100-nm or 50-nm particle filtration rate of preferably not less than 90%, and more preferably not less than 95%.

The particle filtration rate is determined as follows. Particle size-controlled polystyrene latex particles are dispersed in deionized water to prepare a dispersion of approximately 100 ppm as an original liquid for evaluation, and the original liquid is permeated. The particle filtration rate is calculated based on the following expression.

Particle filtration rate(%)=((Absorbance of original liquid for evaluation)−(Absorbance of permeated liquid))/(Absorbance of original liquid for evaluation)×100

The porous polymer membrane of the present invention preferably has a maximum point breaking strength of not lower than 1.0 MPa, and more preferably not lower than 2.0 MPa in terms of mechanical strength.

The maximum point breaking strength is determined by measuring the breaking strength of a sample piece under conditions of a distance between chucks of 50 mm and a tension speed of 200 mm/min., where the sectional area of the sample piece before the tensile test is set as a unit measurement area.

The porous polymer membrane of the present invention preferably has a maximum point elongation of not less than 120%, and more preferably not less than 150%.

The maximum point elongation is determined by measuring the elongation at break of a sample piece under conditions of a distance between chucks of 50 mm and a tension speed of 200 mm/min., and calculating the elongation rate at the maximum point based on the distance between chucks of 50 mm.

The porous polymer membrane of the present invention may have any structure. For example, the membrane may have a three-dimensional network structure in which the solid components three-dimensionally spread and form a net, or may have a spherical structure in which many spherical or substantially spherical solid components are combined to each other directly or through streak solid components. The membrane may have both of these structures simultaneously.

The porous polymer membrane of the present invention is preferably a flat membrane or a hollow fiber membrane, and is more preferably a hollow fiber membrane in terms of the amount of water to be treated per area or per volume.

If the porous polymer membrane of the present invention is a flat membrane, the porous polymer membrane preferably has thickness of 10 µm to 1 mm, and more preferably 30 µm to 500 µm.

If the porous polymer membrane of the present invention is a hollow fiber membrane, the hollow fiber membrane preferably has an inner diameter of 100 µm to 10 mm, and more preferably 150 µm to 8 mm. The hollow fiber membrane preferably has an outer diameter of 120 µm to 15 mm, and more preferably 200 µm to 12 mm.

The porous polymer membrane of the present invention preferably has a thickness of 20 µm to 3 mm, and more preferably 50 µm to 2 mm. The pore sizes of the inner and outer surfaces of the hollow fiber membrane may be freely determined depending on the application thereof; however, the sizes are preferably in a range of 2 nm to 1.0 µm, and more preferably in a range of 5 nm to 0.5 µm.

The porous polymer membrane of the present invention is preferable for a microfiltration membrane or ultrafiltration membrane which is used for treating water in production of drinking water, water purification treatment, and waste water treatment. Moreover, in the field of ultra-pure water production, the porous polymer membrane of the present invention may be used as a charged porous membrane which increases ion exclusion performance to provide pure water with a higher purity. The porous polymer membrane of the present invention has a high permeability to liquid to be treated, and is thus preferably for use as a porous polymer membrane for treating water.

Moreover, the porous polymer membrane of the present invention is favorably used in such fields as the medical, food, and battery fields.

In the medical field, the porous polymer membranes of the present invention can be used for blood purification, more specifically, as a membrane for blood purification to remove waste in blood by an extracorporal circulation, such as blood dialysis, blood filtration, and blood diafiltration, which replaces kidney function.

In the food field, the porous polymer membrane of the present invention can be used for separation and removal of yeasts after fermentation, or for enrichment of liquid.

In the battery field, the porous polymer membrane of the present invention can be used as a separator for batteries to allow an electrolyte to pass therethrough but retains battery reaction products, and as a base material for polymer solid electrolytes.

The porous polymer membrane of the present invention can be used as it is as a porous membrane for the aforementioned applications. Also, the membrane may be used in integration with other porous base materials, or other porous resin members made of other resin (complex membrane).

Examples of other resins include the aforementioned thermoplastic resins.

Specifically, for example, for use as a flat membrane, the flat membrane may be produced by covering the surface of a porous base material with the porous polymer membrane of the present invention, or may be formed by stacking a layer made of a porous base material and a layer of the porous polymer membrane of the present invention. Moreover, the membrane may be formed by stacking a layer of a porous base material, a layer of the porous polymer membrane of the present invention, and the porous resin member in an arbitrary order.

Furthermore, for use as a hollow fiber membrane, the hollow fiber membrane may be produced by providing a porous cover layer made of the aforementioned other resin over the surface (inner surface and/or outer surface) of the porous polymer membrane of the present invention in a hollow fiber membrane shape, and then the layers are integrated.

Examples of the porous base material include a fabric, textile, or unwoven fabric containing organic fibers, such as polyester fiber, nylon fiber, polyurethane fiber, acrylic fiber, rayon fiber, cotton, and silk. Other examples thereof include a fabric, textile, or unwoven fabric containing an inorganic fiber, such as glass fiber and metal fiber. In terms of flexibility and cost, a porous base material containing an organic fiber is preferable.

The pore size of pores in the surface of the porous base material may be freely determined depending on the application; however, it is preferably 5 nm to 1.0 µm, and more preferably 8 nm to 0.5 µm.

The following describes a method of producing the porous polymer membrane according to the present invention.

A method of producing the porous polymer membrane according to the present invention includes at least a step of forming a porous membrane from a fluoropolymer (A') that includes a vinylidene fluoride unit and a tetrafluoroethylene unit.

First, a method of producing a fluoropolymer (A') that includes a vinylidene fluoride unit and a tetrafluoroethylene unit is explained.

The fluoropolymer (A') can be produced by conventionally known methods. For example, the fluoropolymer (A') can be produced by polymerization, such as solution polymerization, bulk polymerization, emulsion polymerization, and suspension polymerization. Preferably, it is produced by emulsion polymerization or suspension polymerization for an easier industrial implementation.

Polymerization initiators, surfactants, chain transfer agents, and solvents, including conventionally known ones, may be used in the polymerization.

The solvent may be appropriately selected depending on the type of polymerization. Examples thereof include water, a mixed solvent of water and alcohol, and a fluorine-containing solvent.

Examples of the polymerization initiators include oil-soluble radical polymerization initiators and water-soluble radical polymerization initiators.

Examples of the surfactants include known surfactants. For example, nonionic surfactants, anionic surfactants, and cationic surfactants may be used. Fluorine-containing anionic surfactants are especially preferable. The surfactants may contain an ether-bonding oxygen atom (i.e., an oxygen atom may exist between carbon atoms). More preferable examples include $C_4$-$C_{20}$ linear or branched fluorine-containing anionic surfactants.

Examples of the chain transfer agents include hydrocarbons, such as ethane, isopentane, n-hexane or cyclohexane; aromatic compounds, such as toluene or xylene; ketones such as acetone; acetic esters such as ethylacetate or butyl acetate; alcohols, such as methanol or ethanol; mercaptanes, such as methyl mercaptane; and halogenated hydrocarbons, such as carbon tetrachloride, chloroform, methylene chloride, or methyl chloride. The amount of the chain transfer agent to be added may vary depending on the chain transfer constant of the compound; however, the amount is normally in a range of 0.001 to 10% by mass relative to the amount of the polymerization solvent.

The polymerization temperature is any temperature and may be 0 to 100° C. The polymerization pressure is appropriately determined depending on other polymerization conditions, such as the kind, amount, and vapor pressure of the solvent to be used, or polymerization temperature; however, it may normally be 0 to 9.8 MPaG.

The fluoropolymer (A') can be produced by the aforementioned methods, or may be any commercially available product.

Examples of the commercially available product include NEOFLON VT50, VP50, VT100, VP100, VP101 and VP100x produced by Daikin Industries, Ltd.

The fluoropolymer (A') includes the vinylidene fluoride unit and the tetrafluoroethylene unit in a molar ratio of the vinylidene fluoride unit/tetrafluoroethylene unit of 50 to 90/50 to 10.

If the amount of the VdF unit is too small, the fluoropolymer (A') is not easily dissolved in a solvent. Thus, formation of porous polymer membranes may be difficult. If the amount of the TFE unit is not less than 10 mol %, defluorination and alcohol-addition reaction properly occur in an alkali treatment step mentioned below, which reduces the number of double bonds in a porous polymer membrane to be obtained. Thus, the membrane can be prevented from degrading.

The fluoropolymer (A') that includes not less than 15 mol % of the TFE unit more significantly exerts the aforementioned effects. Thus, the molar ratio of the VdF unit/TFE unit is more preferably 60 to 85/40 to 15.

The fluoropolymer (A') has a surface that has a (C—F/C—H) ratio representing a ratio of C—F bonds to C—H bonds of preferably not less than 1.2 when measured by X-ray photoelectron spectroscopy (XPS).

Moreover, the fluoropolymer (A') preferably has a ratio of oxygen/fluorine content (O/F) of less than 0.050 (including no detection of oxygen peaks) when measured by X-ray photoelectron spectroscopy (XPS).

Here, the fluoropolymer (A') formed into a porous membrane shape may be used as a sample for the measurements of the surface of the fluoropolymer (A') by X-ray photoelectron spectroscopy (XPS).

The production method of the present invention includes a step of forming a porous membrane from the fluoropolymer (A') or a mixture of the fluoropolymer (A') and another resin (hereinafter, both are collectively referred to as fluoropolymer (A')-containing material).

Examples of another resin include resins other than the fluoropolymer (A) that may be contained in the aforementioned porous polymer membrane of the present invention.

The step of forming a porous membrane can be performed by various methods. Examples of the methods include a phase separation method, a melt extraction method, a steam coagulation method, a stretching method, an etching method, a method of sintering a polymer sheet to be formed into a porous membrane, a method of crushing a cellular polymer sheet to form a porous membrane, and a method using electrospinning technique.

The melt extraction method is performed by melt-mixing the fluoropolymer (A')-containing material, inorganic particles, and an organic liquid; molding the mixture with a press machine or by extruding it from a die at a temperature of the melting point of the fluoropolymer (A') or higher, followed by cooling solidification; and then extracting the organic liquid and inorganic particles to thereby form a porous structure.

The steam coagulation method includes preparing a fluoropolymer solution by dissolving the fluoropolymer (A') in a good solvent, forming a thin membrane from the fluoropolymer solution, and forcedly supplying at least one surface of the thin membrane with steam containing saturated steam or mist of a poor solvent which is compatible with the good solvent and does not dissolve the fluoropolymer(A)-containing material.

The membrane forming method is preferably a phase separation method because of the ease of pore size control. Examples of the phase separation method include a thermally induced phase separation method (TIPS), and a non-solvent induced phase separation method (NIPS).

Porous membranes produced through a non-solvent induced phase separation method have a good mechanical strength due to relatively easy formation of the three-dimensional network structures. Such porous membranes are favorably used for production of asymmetric membranes. Porous membranes produced through a thermally induced phase separation method tend to be excellent in water permeability due to relatively easy formation of the spherical structures. Such porous membranes can have a higher mechanical strength by increasing the concentration of the polymer solution during membrane formation. The above is preferably taken into consideration for choosing the method of forming membranes.

In the case of employing a thermally induced phase separation method, a porous membrane-shaped product can be obtained through a step of dissolving the fluoropolymer (A')-containing material in a poor solvent or a good solvent at a relatively high temperature to obtain a solution of the fluoropolymer (A')-containing material and a step of cooling solidification of the solution.

The fluoropolymer solution, in which the fluoropolymer (A')-containing material is dissolved in a solvent, is a single-phase homogeneous liquid when it is maintained at a temperature higher than the cloud point. Phase separation occurs at a temperature not higher than the cloud point, so that the solution is separated into two phases, a polymer-rich phase and a solvent-rich phase. When the temperature further lowers to not higher than the crystallization temperature, the polymer matrix is immobilized to form a porous membrane.

In the case of employing a thermally induced phase separation method, the fluoropolymer solution preferably contains 10 to 60% by weight or more preferably 15 to 50% by weight of the fluoropolymer (A')-containing material in a total of the fluoropolymer (A')-containing material and the solvent.

The viscosity of the fluoropolymer solution can be adjusted in a proper range by controlling the concentration of the fluoropolymer (A')-containing material in a proper range. A porous membrane may not be formed from the fluoropolymer solution having a viscosity outside the proper range.

The poor solvent refers to a solvent that cannot dissolve not less than 5% by weight of the fluoropolymer (A')-containing material at a temperature below 60° C. but can dissolve not less than 5% by weight of the material at a temperature not lower than 60° C. but not higher than the melting point of the resin (the melting point of the fluoropolymer (A'), or in the case of including another resin, the melting point of the fluoropolymer (A') or the melting point of another resin, whichever is lower). In contrast, the good solvent refers to a solvent that can dissolve not less than 5% by weight of the fluoropolymer (A')-containing material at a temperature below 60° C. A non-solvent refers to a solvent that does not dissolve or swell the fluoropolymer (A')-containing material until the temperature reaches the melting point of the resin or the boiling point of the liquid.

Examples of the poor solvent for the fluoropolymer (A')-containing material include alkyl ketones, esters, glycol esters and organic carbonates having a medium chain length, such as cyclohexanone, isophorone, γ-butyrolactone, methyl isoamyl ketone, dimethyl phthalate, diethyl phthalate, propylene glycol methyl ether, propylene carbonate, diacetone alcohol, and glycerol triacetate; and mixed solvents thereof. Other examples include diphenyl carbonate, methyl benzoate, diethylene glycol ethyl acetate, and benzophenone. Meanwhile, a mixture of a non-solvent and a poor solvent is considered a poor solvent when the mixture satisfies the above definition of a poor solvent.

In the case of employing a thermally induced phase separation method, the solvent for the fluoropolymer solution is preferably, but not limited to, a poor solvent. A good solvent may be used in consideration of the phase separation behavior of the fluoropolymer (A')-containing material.

Examples of the good solvent include lower alkyl ketones, esters, and amides, such as N-methyl-2-pyrrolidone, dimethyl sulfoxide, dimethylacetamide, dimethylformamide, methyl ethyl ketone, acetone, tetrahydrofuran, tetramethylurea, and trimethyl phosphate; and mixed solvents thereof.

Examples of the non-solvent include water, and aliphatic hydrocarbons, aromatic hydrocarbons, aliphatic polyhydric alcohols, aromatic polyhydric alcohols, and chlorinated hydrocarbons, such as hexane, pentane, benzene, toluene, methanol, ethanol, propanol, carbon tetrachloride, o-dichlorobenzene, trichloroethylene, ethylene glycol, diethylene glycol, triethylene glycol, propylene glycol, butylene glycol, pentanediol, hexanediol, and low-molecular-weight polyethylene glycols; or other chlorinated organic liquids; and mixed solvents thereof.

In the case of employing a thermally induced phase separation method, the fluoropolymer solution is prepared by dissolving the fluoropolymer (A')-containing material in a poor solvent or good solvent preferably at a temperature of 20 to 220° C., and more preferably at a temperature of 30 to 200° C. If the fluoropolymer (A')-containing material is dissolved at a relatively high temperature, the concentration thereof can be increased. Thereby, a porous polymer membrane produced through the subsequent steps is allowed to have high mechanical strength.

An excessively high concentration of the fluoropolymer (A')-containing material leads to a low void rate in a porous polymer membrane to be obtained. Thus, the water permeability may be lowered. A porous membrane-shaped product may not be formed if a prepared fluoropolymer solution has a viscosity outside the proper range.

The method for cooling solidification of the fluoropolymer solution is preferably performed, for example, by extruding the fluoropolymer solution from a die into a cooling bath. For forming a flat porous polymer membrane, the cooing solidification is preferably performed by, for example, casting the solution and then immersing it in a cooling bath.

Examples of cooling liquid usable for the cooling bath include liquid having a temperature lower than that of the fluoropolymer solution. For example, liquid containing 60 to 100% by weight of a poor solvent or good solvent and having a temperature of 5 to 50° C. may be used. A non-solvent, or a non-solvent containing a poor solvent or good solvent may be used as the cooling liquid.

In the step of preparing a porous membrane-shaped product, the concentration of the fluoropolymer solution, the composition of the solvent for dissolving the fluoropolymer (A')-containing material, and the composition of the cooling liquid for the cooling bath are important. The porous structure of the porous polymer membrane to be produced through the subsequent steps can be controlled by adjusting the above compositions.

For example, when the composition of the fluoropolymer solution and the composition of the cooling liquid in one side of the porous membrane-shaped product are different from those in the other side, the two sides of the porous polymer membrane are allowed to have different structures from each other.

In the case of the production by a non-solvent induced phase separation method, a porous membrane-shaped product can be obtained through a step of preparing a fluoropolymer solution by dissolving the fluoropolymer (A')-containing material in a solvent and a step of extruding the solution from a die into a solidifying bath containing a non-solvent.

When the fluoropolymer solution is immersed in the solidifying bath containing a non-solvent, a concentration gradient between the solvent and the non-solvent in the fluoropolymer solution and the solidifying bath causes non-solvent-induced phase separation. In this method, a dense skin layer is formed on an outer surface where a phase separation first occurs due to an exchange between the solvent and the non-solvent. The phase separation phenomenon proceeds with time to the inner side of the membrane. As a result, an asymmetric membrane can be produced in which the pore size is continuously increased from the skin layer to the inner side of the membrane.

In the case of employing a non-solvent induced phase separation method, the fluoropolymer solution preferably includes the fluoropolymer (A')-containing material and a solvent. The fluoropolymer solution containing a non-solvent in addition to the fluoropolymer (A')-containing material and a solvent is also a preferable embodiment of the present invention.

The fluoropolymer solution preferably contains 5 to 35% by weight or more preferably 10 to 25% by weight of the fluoropolymer (A')-containing material in a total of the fluoropolymer (A')-containing material, a solvent, and a non-solvent (in a total of the fluoropolymer (A')-containing material and a solvent in the case of containing no non-solvent).

The fluoropolymer solution preferably contains 0.1 to 10% by weight or more preferably 0.5 to 8% by weight of a non-solvent in a total of the fluoropolymer (A')-containing material, a solvent, and a non-solvent.

The concentration of the fluoropolymer (A')-containing material controlled in an appropriate range enables to control the viscosity of the fluoropolymer solution in an appropriate range. A porous membrane may not be formed from the fluoropolymer solution having a viscosity outside the appropriate range.

The fluoropolymer solution having a normal temperature or being heated may be used. For example, the fluoropolymer solution having a temperature of 10 to 35° C. is preferably used.

In the non-solvent induced phase separation method, the same solvents as those listed for the thermally induced phase separation method may be used. The solvent may be any of poor solvents and good solvents, but a good solvent is preferably used.

The same non-solvents as those listed for the thermally induced phase separation method may be used.

For solidification, a liquid containing a non-solvent is preferably used as a solidifying liquid to be used for the solidifying bath. The liquid may contain a poor solvent or a good solvent. The same non-solvents listed for the thermally induced phase separation method may be used. For example, water can be preferably used as the non-solvent.

The thermally induced phase separation method and the non-solvent induced phase separation method may be employed in combination in the step of preparing the porous membrane-shaped product.

In the non-solvent induced phase separation method and/or the thermally induced phase separation method, a porous membrane-shaped product can be prepared by dissolving the fluoropolymer (A')-containing material in a solvent to give a fluoropolymer solution, extruding the fluoropolymer solution from a die, and solidifying the extruded solution. Examples of the die include a slit die, a double co-extrusion head, and a triple co-extrusion head.

For production of a hollow fiber membrane-shaped product as the porous membrane-shaped product, preferable examples of the die include a double co-extrusion head or a triple co-extrusion head for spinning hollow fiber membranes.

In the case of using a double co-extrusion head, the fluoropolymer solution is extruded from the outer tube of the double co-extrusion head while ejecting a fluid for forming the hollow portion, such as deionized water, from the inner tube, followed by solidification in a solidifying bath or a cooling bath. Thereby, a hollow fiber membrane-shaped product can be produced.

The fluid for forming the hollow portion is normally gas or liquid. Liquid containing a poor solvent or good solvent having a concentration of 60 to 100%, which is similar to the cooling liquid, is preferably used in the thermally induced phase separation method. Also, a non-solvent or a non-solvent containing a poor solvent or good solvent may be applicable. In the non-solvent induced phase separation method, preferable examples of the fluid for forming the hollow portion include the aforementioned non-solvents, for example, water such as deionized water. The non-solvent may contain a poor solvent or a good solvent.

A hollow fiber membrane-shaped product having two kinds of structures can be produced by changing the composition of the fluid for forming the hollow portion and the composition of the cooling liquid or the solidifying liquid. The fluid for forming the hollow portion may be cooled before it is supplied. In the case where the cooling bath can sufficiently solidify the hollow fiber membrane-shaped product, the fluid may be supplied without pre-cooling.

A triple co-extrusion head is preferably used when two kinds of resin solutions are used. For example, a hollow fiber membrane-shaped product can be produced by extruding two kinds of fluoropolymer solutions from the outer tube and the middle tube of a triple co-extrusion head while ejecting the liquid for forming the hollow portion from the inner tube, and solidifying the extruded solutions in a solidifying bath or cooling bath. A hollow fiber membrane-shaped product can also be produced by extruding the fluoropolymer solution and a resin solution containing a resin other than the fluoropolymer from the outer tube and the middle tube, respectively, of the triple co-extrusion head while ejecting the fluid for forming the hollow portion from the inner tube, and solidifying the extruded solutions in a solidifying bath or a cooling bath.

Formation of the hollow fiber membrane-shaped product by the aforementioned production method using a double co-extrusion head or a triple co-extrusion head is preferable in terms of reducing the amount of the solidifying liquid or cooling liquid, as compared with formation of a flat membrane.

If the desired porous polymer membrane is a hollow fiber membrane, a resin layer including the fluoropolymer (A) or a resin layer including a resin other than the fluoropolymer (A) may further be formed on the outer surface or inner surface of the product obtained by the aforementioned method.

Formation of the resin layer including a resin other than the fluoropolymer (A) enables to produce a hollow fiber membrane in which the porous polymer membrane including the fluoropolymer (A) is integrated with the resin layer formed on its surface.

The resin layer can be formed by applying a solution of the fluoropolymer (A) or a resin solution on the outer surface or inner surface of the hollow fiber membrane-shaped product. Preferable examples of the method for applying the solution of the fluoropolymer (A) or the resin solution include immersion of the hollow fiber membrane-shaped product in the solution or dropping of the solution on the hollow fiber membrane-shaped product. Preferable examples of the method for applying the solution on the inner surface of the hollow fiber membrane-shaped product include feeding of the solution into the hollow fiber membrane-shaped product.

The amount of the solution to be applied is preferably controlled by just adjusting the amount of the solution or, alternatively, by scratching off or blowing off with an air knife a part of the solution, after immersion of the porous membrane in the solution or application of the solution on the porous membrane.

If the desired porous membrane-shaped product is a flat membrane-shaped product, it can be produced by casting the solution of the fluoropolymer (A'), followed by immersion in a cooling bath or solidifying bath. Also, the flat membrane-shaped product can be produced by extruding the solution of the fluoropolymer (A') through a slit die into a cooling bath or solidifying bath.

For producing a composite porous polymer membrane of the present invention in which porous base materials and other materials are integrated with each other, immersion of the porous base materials in the solution of the fluoropolymer (A') or application of the solution of the fluoropolymer (A') on at least one side of the porous base materials may be performed.

The obtained porous membrane-shaped product may further be stretched. This enables to further enhance the water permeability of the porous polymer membrane.

If an alkali treatment mentioned later is included, the stretching treatment may be performed after the alkali treatment.

In this step, the pore size of the porous membrane-shaped product may be controlled, for example, by adding an additive for controlling the pore size in the fluoropolymer solution, and then eluting the additive during or after formation of the porous membrane-shaped product. The additive may be kept in the porous membrane-shaped product, if necessary.

Examples of the additives include organic compounds and inorganic compounds. The organic compounds are preferably those that are soluble in the solvent contained in the fluoropolymer solution. In a non-solvent induced phase separation method, the organic compounds are preferably soluble in the non-solvent contained in the solidifying liquid. In a thermally induced phase separation method, the organic compounds are preferably soluble in the solvent contained in the cooling liquid.

Examples of the organic compounds include water-soluble polymers, surfactants, glycerin, and saccharides, such as polyvinyl pyrrolidone, polyethylene glycol, polyvinyl alcohol, polyethylene mine, polyacrylic acid, and dextran.

Preferable examples of the inorganic compounds include water-soluble compounds, such as calcium chloride, lithium chloride, and barium sulfate.

Instead of using the additive for controlling the pore size of the porous membrane-shaped product, the average pore size in the surface can be controlled by selecting the type, concentration, and temperature of the non-solvent in the solidifying liquid so as to control the phase separation speed. Generally, a high phase separation speed leads to a small average pore size, and a low phase separation speed leads to a large average pore size. Also, addition of a non-solvent to the fluoropolymer solution is advantageous for controlling the phase separation speed.

From the viewpoints of hydrophilization and control of the phase separation, the fluoropolymer solution may further contain an additive, such as polyvinyl pyrrolidone, polymethyl methacrylate resin, montmorillonite, $SiO_2$, $CaCO_3$, and PTFE.

Through the aforementioned steps, a porous polymer membrane including the fluoropolymer (A) can be produced by the method of producing the porous polymer membrane according to the present invention.

The method of producing a porous polymer membrane according to the present invention may further include a step of performing an alkali treatment.

The alkali treatment may be performed after or before the step of forming a porous membrane from the fluoropolymer (A').

The step of performing an alkali treatment (hereinafter, also referred to as alkali treatment step) includes contacting the porous membrane-shaped product with an alkali treatment solution, which is prepared by dissolving a solid or liquid alkali in water and/or a $C_1$-$C_8$ alcohol, by, for example, immersing the porous membrane-shaped product in the alkali treatment solution or applying the alkali treatment solution to the porous membrane-shaped product.

Examples of the alkali include alkali metal hydroxides such as sodium hydroxide, and potassium hydroxide; alkaline earth metal hydroxides such as magnesium hydroxide, and calcium hydroxide; alkali metal alkoxides or alkaline earth metal alkoxides; and organic amines such as trimethylamine, and triethylamine.

The alcohol may be any $C_1$-$C_8$ alcohol, but is preferably ethanol or methanol.

The concentration of the alkali in the alkali treatment solution is not particularly limited. For example, in the case where the alkali is sodium hydroxide, a 0.01 to 8N alkali treatment solution may be used.

In the case where the alkali treatment solution contains water and the alcohol, the volume ratio of water to the alcohol may be optional but is preferably about 30 to 70/70 to 30.

In the case where the porous membrane-shaped product is immersed in the alkali treatment solution in this step, the immersion may be performed for any time period at any temperature. Normally, the product is immersed in the solution having a temperature of 5 to 70° C. for several minutes to several days.

The method of producing the porous polymer membrane according to the present invention may include a wetting treatment on the porous membrane-shaped product prior to the alkali treatment step. In particular, when the porous membrane-shaped product or the fluoropolymer (A'), on which the alkali treatment is to be performed, is not easily wettable, a wetting treatment allows it to be easily wettable.

The wetting treatment may be performed, for example, by immersing an object of the alkali treatment in alcohol such as methanol and ethanol, and then replacing the alcohol with water.

After the alkali treatment step, the alkali treatment solution may be replaced with water, if necessary.

In the method of producing the porous polymer membrane according to the present invention, as mentioned earlier, the porous membrane forming step may be performed after the step of treating the fluoropolymer (A') with the alkali by the aforementioned method.

Moreover, the porous membrane forming step may be performed after the step of treating the fluoropolymer (A') with the alkali by the aforementioned method, and then again the alkali treatment step may be performed.

In the method of producing the porous polymer membrane according to the present invention, through the alkali treatment step, a part of the VdF unit in the fluoropolymer (A') is replaced with the formula (1) unit by the defluorination and subsequent addition of water or alcohol. Thereby, a porous polymer membrane including the fluoropolymer (A) that contains the fluoropolymer (A1) can be obtained. Since the fluoropolymer (A) has only a small number of double bonds, it maintains a good solubility in a solvent and thus has excellent membrane-forming property. Also, the obtained membrane tends not to be degraded. Accordingly, an excellent porous polymer membrane is obtained.

As mentioned earlier, the method of producing the porous polymer membrane according to the present invention enables to favorably produce the porous polymer membrane of the present invention.

EXAMPLES

The present invention is described in more detail by, but not limited to, examples below.

In the examples, hollow fiber membranes were produced and evaluated by the methods mentioned below.

[Pure Water Permeability Coefficient]

The pure water permeability coefficient was determined by permeating deionized water through a produced hollow fiber membrane at 25° C. The deionized water was pressurized to not lower than 0.01 MPa with nitrogen gas.

Pure water permeability coefficient[$m^3/m^2/s/Pa$]= (Amount of permeated water)/(Area of membrane)/(Permeation time)/(Evaluation pressure)

[Particle Filtration Rate]

Particle size-controlled polystyrene latex particles were dispersed in deionized water (approximately 100 ppm) to prepare an original liquid for evaluation, and the original liquid was permeated. The particle filtration rate was calculated based on the following expression.

Particle filtration rate(%)=((Absorbance of original liquid for evaluation)−(Absorbance of permeated liquid))/(Absorbance of original liquid for evaluation)×100

[Maximum Point Breaking Strength]

The maximum point breaking strength was determined by measuring the breaking strength of a sample piece under conditions of a distance between chucks of 50 mm and a tension speed of 200 mm/min., where the sectional area of the sample piece before the tensile test was set as a unit measurement area.

[Maximum Point Elongation]

The maximum point elongation was determined by measuring the elongation at break of a sample piece under conditions of a distance between chucks of 50 mm and a tension speed of 200 mm/min., and calculating the elongation rate at the maximum point based on the distance between chucks of 50 mm.

[Alkali Treatment]

The alkali treatment was performed under the following conditions in the examples and comparative examples.

Alkali treatment (1): Hollow fiber was immersed in a 1N solution (alkali treatment solution) of NaOH in ethanol/water (50/50 volume %)

Alkali treatment (2): Hollow fiber was immersed in a 1N aqueous NaOH solution (alkali treatment solution).

Alkali treatment (3): Hollow fiber was immersed in a 1N solution (alkali treatment solution) of NaOH in isopropanol/water (50/50 volume %)

The alkali treatment was performed under the same condition as in the alkali treatment (1) unless otherwise stated.

[Surface Measurement by X-ray Photoelectron Spectroscopy (XPS)]

The surface of the porous polymer membrane (and porous membrane-shaped product) was measured by X-ray photoelectron spectroscopy (XPS) in accordance with the following method.

The measurement was performed with ESCA3400 (produced by Shimadzu Corporation) using Mg Kα X-ray source (1253.6 eV). The diameter of the measurement area was about 3 mm, and the detection depth was about 7 nm (photoelectron take-off angle: 90°).

[(C—F/C—H)Ratio]

The (C—F/C—H) ratio was calculated based on an expression below using the values obtained by X-ray photoelectron spectroscopy (XPS).

(C—F/C—H)ratio=$a/b$ a: Value of the peak area of the interatomic bonding energy (292.4 eV) derived from C—F bonds b: Value of the peak area of the interatomic bonding energy (286.0 eV and 287.8 eV) derived from C—H bonds

[(O/F) Ratio]

The (O/F) ratio was calculated based on an expression below using the values obtained by X-ray photoelectron spectroscopy (XPS).

(O/F)ratio=$A/B$

A: Value of the peak area of oxygen

B: Value of the peak area of fluorine

[C—O bond content in a total of C—C bonds and bonds between C and an atom other than C]

The ratio was calculated based on an expression below using the values obtained by X-ray photoelectron spectroscopy (XPS).

C—O bond in a total of C—C bonds and bonds between C and an atom other than C=$\alpha/\beta$ α: Value of the peak area of the interatomic bonding energy (290.1 eV) derived from C—O bonds β: Value of the peak area of a total of the interatomic bonding energy (280.0 to 300.0 eV) derived from C—C bonds and bonds between C and an atom other than C

Example 1

A polymer solution was prepared by mixing 23% by weight of a vinylidene fluoride-tetrafluoroethylene copolymer (vinylidene fluoride/tetrafluoroethylene=80/20 (molar ratio)), 68% by weight of dimethylformamide, 6% by weight of water, and 3% by weight of Tween 40 at 25° C.

The polymer solution was extruded from a double co-extrusion head together with deionized water serving as an internal fluid, and solidified in deionized water to give a hollow fiber membrane-shaped product.

The hollow fiber membrane-shaped product had an outer diameter of 0.95 mm and an inner diameter of 0.79 mm; a pure water permeability coefficient at 25° C. of $7.3 \times 10^{-10}$ [$m^3/m^2/Pa/s$]; a 50-nm polystyrene particle filtration rate of not less than 98%; a maximum point breaking strength of 3.2 MPa; and a maximum point elongation of 410%.

The surface of the product had a ratio of oxygen/fluorine content (O/F) of 0.044 when measured by XPS. The (C—F/C—H) ratio representing a ratio of the C—F bond to the C—H bond was 1.28.

The O—O bond content in a total of C—C bonds and bonds between C and an atom other than C was not more than 0.70 mol %.

Next, the hollow fiber membrane-shaped product obtained through the above steps was subjected to an alkali treatment under the following conditions to give hollow fiber membranes.

Example 1-1

Alkali treatment (1) for 0.5 hour

Example 1-2

Alkali treatment (1) for 4.5 hours

Example 1-3

Alkali treatment (1) for 24 hours

The physical properties of the resulting hollow fiber membranes were as follows.

Example 1-1

The membrane had a pure water permeability coefficient of $7.4 \times 10^{-10}$ [m$^3$/m$^2$/Pa/s]; a 50-nm polystyrene particle filtration rate of not less than 98%; a maximum point breaking strength of 2.9 MPa; and a maximum point elongation of 410%.

Example 1-2

The membrane had a pure water permeability coefficient of $9.8 \times 10^{-10}$ [m$^3$/m$^2$/Pa/s]; a 50-nm polystyrene particle filtration rate of not less than 98%; a maximum point breaking strength of 2.8 MPa; and a maximum point elongation of 460%.

The color of the porous hollow fiber membranes was not changed by the alkali treatment in Examples 1-1 and 1-2.

Example 1-3

The membrane had a pure water permeability coefficient of $1.9 \times 10^{-9}$ [m$^3$/m$^2$/Pa/s]; a 50-nm polystyrene particle filtration rate of not less than 98%; a maximum point breaking strength of 5.1 MPa; a maximum point elongation of 330%; a (O/F) ratio of 0.087; and a (C—F/C—H) ratio of 0.94. The C—O bond content in a total of C—C bonds and bonds between C and an atom other than C was 2.95 mol %. Also, a unit represented by the formula:

—CHX$^1$—CX$^2$(OR)—

(wherein one of X$^1$ and X$^2$ is a hydrogen atom, and the other is a fluorine atom; and R is a hydrogen atom or a C$_2$ alkyl group) was generated.

The hollow fiber membrane obtained in Example 1-3 was only slightly colored, showed very little change in color, and maintained the strength.

Moreover, the hollow fiber membranes obtained in Examples 1-2 and 1-3 had enhanced water permeability. In particular, the water permeability of the membrane in Example 1-3 was enhanced by 2.6 times.

Example 2

A polymer solution was prepared by mixing 18% by weight of a vinylidene fluoride-tetrafluoroethylene copolymer (vinylidene fluoride/tetrafluoroethylene=80/20 (molar ratio)), 79.6% by weight of dimethylformamide, and 2.4% by weight of Tween 40 at 25° C. The polymer solution was extruded from a double co-extrusion head together with deionized water serving as an internal fluid, and solidified in deionized water. A resulting hollow fiber membrane had an outer diameter of 1.02 mm and an inner diameter of 0.79 mm; a pure water permeability coefficient at 25° C. of $2.6 \times 10^{-10}$ [m$^3$/m$^2$/Pa/s]; a 50-nm polystyrene particle filtration rate of not less than 98%; a maximum point breaking strength of 1.4 MPa; and a maximum point elongation of 410%.

The surface of the product had a ratio of oxygen/fluorine content (O/F) of 0.044 when measured by XPS. The (C—F/C—H) ratio representing a ratio of the C—F bond to the C—H bond was 1.20. The C—O bond content in a total of C—C bonds and bonds between C and an atom other than C was not more than 0.70 mol %.

Next, the hollow fiber membrane-shaped product obtained through the above steps was subjected to an alkali treatment under the following conditions to give hollow fiber membranes.

Example 2-1

Alkali treatment (1) for 24 hours

Example 2-2

Alkali treatment (1) for 48 hours

Example 2-3

Alkali treatment (2) for 48 hours

Example 2-4

Alkali treatment (3) for 48 hours

The physical properties of the resulting hollow fiber membranes were as follows.

Example 2-1

The membrane had a pure water permeability coefficient of $3.8 \times 10^{-10}$ [m$^3$/m$^2$/Pa/s]; a 50-nm polystyrene particle filtration rate of not less than 98%; a maximum point breaking strength of 1.3 MPa; a maximum point elongation of 350%; a (O/F) ratio of 0.060; and a (C—F/C—H) ratio of 1.05. The C—O bond content in a total of C—C bonds and bonds between C and an atom other than C was 2.00 mol %. Also, a unit represented by the formula:

—CHX$^1$—CX$^2$(OR)—

(wherein one of X$^1$ and X$^2$ is a hydrogen atom, and the other is a fluorine atom; and R is a hydrogen atom or a C$_2$ alkyl group) was generated.

The hollow fiber membrane obtained in Example 2-1 was only slightly colored, showed very little change in color, and maintained the strength.

Example 2-2

The membrane had a pure water permeability coefficient of $4.1 \times 10^{-10}$ [m$^3$/m$^2$/Pa/s]; a 50-nm polystyrene particle filtration rate of not less than 98%; a (O/F) ratio of 0.105; and a (C—F/C—H) ratio of 0.80.

The C—O bond content in a total of C—C bonds and bonds between C and an atom other than C was 5.46 mol %. Also, a unit represented by the formula:

—CHX$^1$—CX$^2$(OR)—

(wherein one of X$^1$ and X$^2$ is a hydrogen atom, and the other is a fluorine atom; and R is a hydrogen atom or a C$_2$ alkyl group) was generated.

Example 2-3

The membrane had a pure water permeability coefficient of $2.9 \times 10^{-10}$ [m$^3$/m$^2$/Pa/s]; a 50-nm polystyrene particle filtration rate of not less than 98%; a (O/F) ratio of 0.099; and a (C—F/C—H) ratio of 0.88.

The C—O bond content in a total of C—C bonds and bonds between C and an atom other than C was 1.54 mol %. Also, a unit represented by the formula:

—CHX$^1$—CX$^2$(OR)—

(wherein one of X$^1$ and X$^2$ is a hydrogen atom, and the other is a fluorine atom; and R is a hydrogen atom) was generated.

Example 2-4

The membrane had a pure water permeability coefficient of $2.8 \times 10^{-10}$ [m$^3$/m$^2$/Pa/s]; a 50-nm polystyrene particle filtration rate of not less than 98%; a (O/F) ratio of 0.061; and a (C—F/C—H) ratio of 1.08.

The C—O bond content in a total of C—C bonds and bonds between C and an atom other than C was 2.60 mol %. Also, a unit represented by the formula:

—CHX$^1$—CX$^2$(OR)—

(wherein one of X$^1$ and X$^2$ is a hydrogen atom, and the other is a fluorine atom; and R is a hydrogen atom or a C$_3$ alkyl group) was generated.

Moreover, the hollow fiber membranes obtained in Examples 2-1 to 2-4 had enhanced water permeability. In particular, the water permeability of the membrane in Example 2-1 and that in Example 2-2 were enhanced by 1.5 times and 1.6 times, respectively. Furthermore, no degradation was found in the membranes.

Example 3

A polymer solution was prepared by mixing 18% by weight of a vinylidene fluoride-tetrafluoroethylene copolymer (vinylidene fluoride/tetrafluoroethylene=63/37 (molar ratio)), 79.6% by weight of dimethylformamide, and 2.4% by weight of Tween 40 at 25° C.

The polymer solution was extruded from a double co-extrusion head together with deionized water serving as an internal fluid. The polymer solution was solidified in deionized water to give a hollow fiber membrane-shaped product.

The hollow fiber membrane-shaped product had an outer diameter of 0.94 mm and an inner diameter of 0.75 mm; a pure water permeability coefficient at 25° C. of $2.0 \times 10^{-9}$ [m$^3$/m$^2$/Pa/s]; a 50-nm polystyrene particle filtration rate of not less than 98%; a maximum point breaking strength of 1.2 MPa; and a maximum point elongation of 340%.

The (O/F) ratio was 0.033, and the (C—F/C—H) ratio was 1.72 on the surface of the product measured by XPS. The C—O bond content in a total of C—C bonds and bonds between C and an atom other than C was not more than 0.70 mol %.

Next, the hollow fiber membrane-shaped product obtained through the above steps was subjected to an alkali treatment under the following conditions to give hollow fiber membranes.

Example 3-1

Alkali treatment (1) for 24 hours

Example 3-2

Alkali treatment (1) for 48 hours

Example 3-3

Alkali treatment (2) for 48 hours

The physical properties of the resulting hollow fiber membranes were as follows.

Example 3-1

The membrane had a pure water permeability coefficient of $5.8 \times 10^{-9}$ [m$^3$/m$^2$/Pa/s]; a 50-nm polystyrene particle filtration rate of not less than 98%; a maximum point breaking strength of 1.1 MPa; a maximum point elongation of 320%; a (O/F) ratio of 0.092; and a (C—F/C—H) ratio of 0.54. The C—O bond content in a total of C—C bonds and bonds between C and an atom other than C was 3.43 mol %. Also, a unit represented by the formula:

—CHX$^1$—CX$^2$(OR)—

(wherein one of X$^1$ and X$^2$ is a hydrogen atom, and the other is a fluorine atom; and R is a hydrogen atom or a C$_2$ alkyl group) was generated.

Example 3-2

The membrane had a pure water permeability coefficient of $9.2 \times 10^{-9}$ [m$^3$/m$^2$/Pa/s]; a 50-nm polystyrene particle filtration rate of not less than 98%; a (O/F) ratio of 0.118; and a (C—F/C—H) ratio of 0.67.

The C—O bond content in a total of C—C bonds and bonds between C and an atom other than C was 3.79 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom or a C$_2$ alkyl group) was generated.

Example 3-3

The membrane had a pure water permeability coefficient of $5.0 \times 10^{-9}$ [m$^3$/m$^2$/Pa/s]; a 50-nm polystyrene particle filtration rate of not less than 98%; a (O/F) ratio of 0.094; and a (C—F/C—H) ratio of 0.98.

The C—O bond content in a total of C—C bonds and bonds between C and an atom other than C was 3.70 mol %. Also, a unit represented by the formula: —CHX$^1$—CX$^2$(OR)— (wherein one of X$^1$ and X$^2$ is a hydrogen atom, and the other is a fluorine atom; and R is a hydrogen atom) was generated.

The hollow fiber membranes obtained in Examples 3-1 to 3-3 had further enhanced water permeability. In particular, the water permeability of the membrane in Example 3-1, that in Example 3-2, and that in Example 3-3 were enhanced by 2.9 times, 4.6 times, and 2.5 times, respectively. Moreover, the hollow fiber membranes obtained in Examples 3-1 to 3-3 were only slightly colored, showed very little change in color, and showed no degradation.

Example 4

A polymer solution was prepared by mixing 18% by weight of a vinylidene fluoride-tetrafluoroethylene copolymer (vinylidene fluoride/tetrafluoroethylene=80/20 (molar ratio)), 79.6% by weight of dimethylformamide, and 2.4% by weight of Tween 40 at 70° C. The polymer solution was extruded from a double co-extrusion head together with deionized water serving as an internal fluid, and solidified in deionized water. A resulting hollow fiber membrane had an outer diameter of 0.84 mm and an inner diameter of 0.61 mm; a pure water permeability coefficient at 25° C. of $6.0 \times 10^{-10}$ [m$^3$/m$^2$/Pa/s]; a 50-nm polystyrene particle filtration rate of not less than 98%; a maximum point breaking strength of 1.6 MPa; and a maximum point elongation of 360%. The hollow fiber membrane after a five-hour alkali treatment had a maximum point breaking strength of 1.6 MPa, and a maximum point elongation of 360%.

Moreover, the hollow fiber membrane after being immersed in an alkaline solution for five hours was only slightly tinted brown with no color change.

Example 5

A polymer solution was prepared by mixing 15.8% by weight of a vinylidene fluoride-tetrafluoroethylene copolymer (vinylidene fluoride/tetrafluoroethylene=80/20 (molar ratio)), 2.2% by weight of a vinylidene fluoride-tetrafluoroethylene copolymer that had undergone an alkali treatment for nine days (vinylidene fluoride/tetrafluoroethylene=63/37 (molar ratio)), 75.0% by weight of dimethylformamide, 2.2% by weight of Tween 40, and 4.7% by weight of water at 25° C. The polymer solution was extruded from a double co-extrusion head together with deionized water serving as an internal fluid, and solidified in deionized water. A resulting hollow fiber membrane had an outer diameter of 0.93 mm and an inner diameter of 0.70 mm; a pure water permeability coefficient at 25° C. of $5.8 \times 10^{-9}$ [$m^3/m^2/Pa/s$]; a 50-nm polystyrene particle filtration rate of not less than 98%; a maximum point breaking strength of 1.0 MPa; and a maximum point elongation of 160%.

The (O/F) ratio was 0.059, and the (C—F/C—H) ratio was 1.21 on the surface of the product measured by XPS.

The C—O bond content in a total of C—C bonds and bonds between C and an atom other than C was 2.52 mol %. Also, a unit represented by the formula:

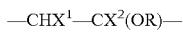

(wherein one of $X^1$ and $X^2$ is a hydrogen atom, and the other is a fluorine atom; and R is a hydrogen atom or a $C_2$ alkyl group) was generated.

Comparative Example 1

A polymer solution was prepared by mixing 18% by weight of polyvinylidene fluoride (product of Daikin Industries, Ltd.), 79.6% by weight of dimethylformamide, and 2.4% by weight of Tween 40 at 25° C.

The polymer solution was extruded from a double co-extrusion head together with deionized water serving as an internal fluid, and solidified in deionized water to give a hollow fiber membrane-shaped product.

The hollow fiber membrane-shaped product had an outer diameter of 1.03 mm and an inner diameter of 0.82 mm; a pure water permeability coefficient at 25° C. of $8.0 \times 10^{-10}$ [$m^3/m^2/Pa/s$]; a 50-nm polystyrene particle filtration rate of not less than 98%; a maximum point breaking strength of 2.0 MPa; and a maximum point elongation of 130%.

The (O/F) ratio was 0.035, and the (C—F/C—H) ratio was 1.01 on the surface of the product measured by XPS.

Next, the hollow fiber membrane-shaped product obtained through the above steps was subjected to an alkali treatment under the following conditions to give hollow fiber membranes.

Comparative Example 1-1

Alkali treatment (1) for 0.5 hour

Comparative Example 1-2

Alkali treatment (1) for 4.5 hours

Comparative Example 1-3

Alkali treatment (1) for 24 hours

Comparative Example 1-4

Alkali treatment (1) for 48 hours

Comparative Example 1-5

Alkali treatment (2) for 48 hours

Comparative Example 1-6

Alkali treatment (3) for 48 hours
The physical properties of the resulting hollow fiber membranes were as follows.

Comparative Example 1-1

The membrane had a pure water permeability coefficient of $6.6 \times 10^{-10}$ [$m^3/m^2/Pa/s$]; a 50-nm polystyrene particle filtration rate of not less than 98%; a maximum point breaking strength of 1.9 MPa; and a maximum point elongation of 120%.

Comparative Example 1-2

The membrane had a pure water permeability coefficient of $6.1 \times 10^{-10}$ [$m^3/m^2/Pa/s$]; a 50-nm polystyrene particle filtration rate of not less than 98%; a maximum point breaking strength of 1.8 MPa; and a maximum point elongation of 120%.

Comparative Example 1-3

The membrane had a pure water permeability coefficient of $8.9 \times 10^{-10}$ [$m^3/m^2/Pa/s$]; a 50-nm polystyrene particle filtration rate of not less than 98%; a maximum point breaking strength of 1.8 MPa; a maximum point elongation of 98%, a (O/F) ratio of 0.079; and a (C—F/C—H) ratio of 0.67.

Comparative Example 1-4

The membrane had a pure water permeability coefficient of $1.1 \times 10^{-9}$ [$m^3/m^2/Pa/s$]; a 50-nm polystyrene particle filtration rate of not less than 98%; a (O/F) ratio of 0.125; and a (C—F/C—H) ratio of 0.51.

Comparative Example 1-5

The membrane had a pure water permeability coefficient of $9.7 \times 10^{-10}$ [$m^3/m^2/Pa/s$]; a 50-nm polystyrene particle filtration rate of not less than 98%; a (O/F) ratio of 0.100; and a (C—F/C—H) ratio of 0.65.

Comparative Example 1-6

The membrane had a pure water permeability coefficient of $9.8 \times 10^{-10}$ [$m^3/m^2/Pa/s$]; a 50-nm polystyrene particle filtration rate of not less than 98%; a (O/F) ratio of 0.083; and a (C—F/C—H) ratio of 0.77.

The membranes in Comparative Examples 1-1 to 1-6 changed color to brown about five minutes after the beginning of the alkali treatment. The porous hollow fiber membranes obtained in Comparative Examples 1-3 to 1-6 were dark brown. In particular, the membrane obtained in Comparative Example 4 was degraded very badly.

Comparative Example 2

A polymer solution was prepared by mixing 18% by weight of polyvinylidene fluoride (KF1100), 79.6% by weight of dimethylformamide, and 2.4% by weight of Tween 40 at 25° C. The polymer solution was extruded from a double co-extrusion head together with deionized water serving as an internal fluid, and solidified in deionized water. The hollow fiber membrane-shaped product had an outer diameter of 0.89 mm and an inner diameter of 0.72 mm; a pure water permeability coefficient at 25° C. of $7.7 \times 10^{-10}$ [m$^3$/m$^2$/Pa/s]; a 50-nm polystyrene particle filtration rate of not less than 98%; a maximum point breaking strength of 2.7 MPa; and a maximum point elongation of 120%.

Next, the hollow fiber membrane-shaped product obtained through the above steps was subjected to an alkali treatment under the following conditions to give hollow fiber membranes.

Comparative Example 2-1

Alkali treatment (1) for 0.5 hour

Comparative Example 2-2

Alkali treatment (1) for 4.5 hours

The physical properties of the resulting hollow fiber membranes were as follows.

Comparative Example 2-1

The membrane had a pure water permeability coefficient of $6.7 \times 10^{-10}$ [m$^3$/m$^2$/Pa/s]; a 50-nm polystyrene particle filtration rate of not less than 98%; a maximum point breaking strength of 2.2 MPa; and a maximum point elongation of 120%.

Comparative Example 2-2

The membrane had a pure water permeability coefficient of $6.5 \times 10^{-10}$ [m$^3$/m$^2$/Pa/s]; a 50-nm polystyrene particle filtration rate of not less than 98%; a maximum point breaking strength of 2.3 MPa; and a maximum point elongation of 110%.

The membranes in Comparative Examples 2-1 and 2-2 changed color to brown about five minutes after the beginning of the alkali treatment. The porous hollow fiber membrane obtained in Comparative Examples 2-2 was dark brown.

INDUSTRIAL APPLICABILITY

The porous polymer membrane can be used for various applications, and is particularly preferably used for water treatment.

The invention claimed is:

1. A porous polymer membrane comprising a fluoropolymer (A) that includes a vinylidene fluoride unit and a tetrafluoroethylene unit,
wherein the membrane is a hollow fiber membrane,
wherein the fluoropolymer (A) includes the vinylidene fluoride unit and the tetrafluoroethylene unit in a molar ratio of the vinylidene fluoride unit/tetrafluoroethylene unit of 50 to 90/50 to 10; and
wherein the porous polymer membrane has a surface that has a ratio of oxygen/fluorine content (O/F) on the surface of not less than 0.050 but not more than 0.118 when measured by X-ray photoelectron spectroscopy (XPS).

2. The porous polymer membrane according to claim 1, wherein the porous polymer membrane has a surface that has a (C—F/C—H) ratio representing a ratio of C—F bonds to C—H bonds on the surface of larger than 0.50 when measured by X-ray photoelectron spectroscopy (XPS).

3. The porous polymer membrane according to claim 1, wherein the fluoropolymer (A) has a unit represented by the following formula (1):

—CHX$^1$—CX$^2$(OR)—     (1)

wherein one of X$^1$ and X$^2$ is a hydrogen atom, and the other is a fluorine atom; and R is a hydrogen atom or a C$_1$-C$_8$ alkyl group.

4. The porous polymer membrane according to claim 3, wherein the R in the formula (1) is a hydrogen atom, a methyl group, or an ethyl group.

5. The porous polymer membrane according to claim 1, wherein the membrane is for treating water.

6. A method of producing the porous polymer membrane according to claim 1, comprising at least a step of forming a porous membrane from a fluoropolymer (A') that includes a vinylidene fluoride unit and a tetrafluoroethylene unit.

7. The method of producing the porous polymer membrane according to claim 6,
wherein the step of forming a porous membrane produces a porous membrane-shaped product through a non-solvent induced phase separation method and/or a thermally induced phase separation method.

8. The method of producing the porous polymer membrane according to claim 6,
further comprising a step of performing an alkali treatment in the presence of water and/or a C$_1$-C$_8$ alcohol.

9. The method of producing the porous polymer membrane according to claim 8,
wherein the alcohol is ethanol or methanol.

10. The method of producing the porous polymer membrane according to claim 6,
wherein the fluoropolymer (A') includes the vinylidene fluoride unit and the tetrafluoroethylene unit in a molar ratio of the vinylidene fluoride unit/tetrafluoroethylene unit of 50 to 90/50 to 10.

* * * * *